UNITED STATES PATENT OFFICE.

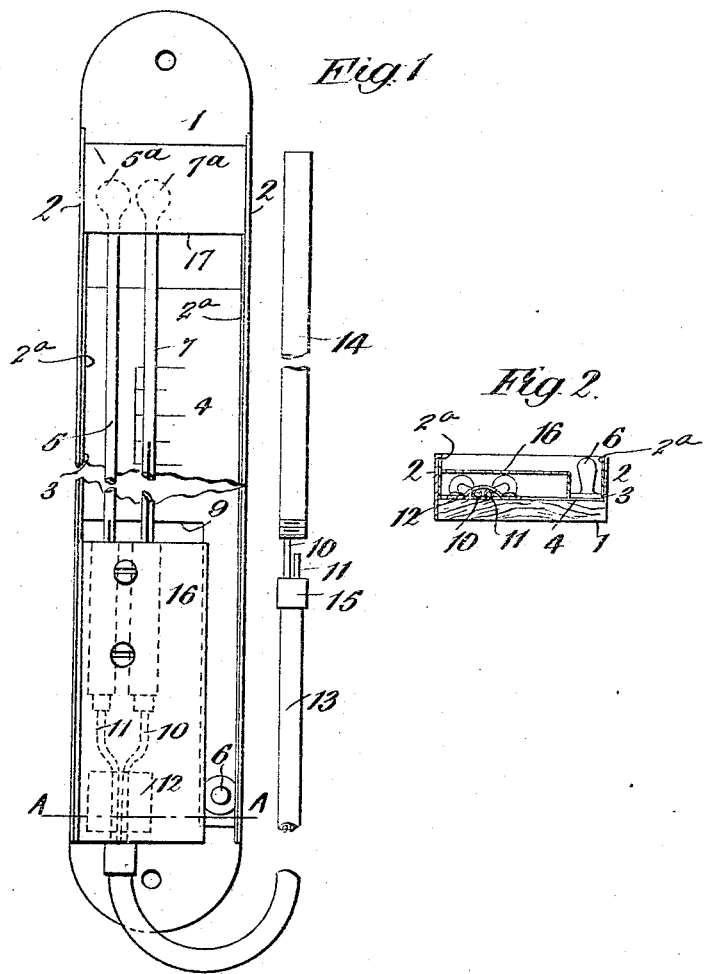

JOHN FOX JENNENS MALONE, OF NEWCASTLE-UPON-TYNE, ENGLAND, ASSIGNOR TO THE SENTINAL COMPANY LIMITED, OF NEWCASTLE-UPON-TYNE, ENGLAND.

DISTANCE-THERMOMETER.

1,298,075.   Specification of Letters Patent.   Patented Mar. 25, 1919.

Application filed May 8, 1917. Serial No. 167,337.

*To all whom it may concern:*

Be it known that I, JOHN FOX JENNENS MALONE, a subject of the King of Great Britain, residing in Newcastle-upon-Tyne, England, have invented certain new and useful Improvements in and Relating to Distance-Thermometers, of which the following is a specification.

This invention relates to distance thermometers in which the vessel or chamber of which it is desired to ascertain the temperature, is located at a point more or less remote or inaccessible from the indicator itself and in which provision is made for compensating for the expansion of fluid outside the main receptacle such provision comprising two tubes, one of which leads to the bulb within the receptacle while the other terminates outside the said bulb. The tubes just above referred to have previously each been connected to indicating tubes preferably of glass of an internal diameter such that motion of the free surface of the liquid thereon may be of convenient amplitude.

The present invention has for its object to provide a simple and efficient form of distance thermometer designed for use with sensitive liquids which if exposed to the atmosphere are vaporizable at normal temperatures, the construction and arrangement being such that not only is any vaporization of the liquids prevented, whereby an incorrect indication would result, but further provision is made whereby incorrect indications of temperature are prevented should the bulb at any time be placed at an altitude higher than the indicating tubes of the thermometer.

To this end in accordance with the present invention I employ two separate glass indicating tubes closed at their upper ends and each provided at this point with an enlargement or bulb designed to contain a gas or gaseous mixture under pressure to counterbalance any pressure of the sensitive liquid which would result should the distance bulb and the tubes associated therewith be raised to a level higher than that of the normal level of the liquid in the indicating tubes.

The pressure of the gas in the aforesaid enlargements is so selected that it will counterbalance any lack of pressure which would result should the distance bulb and the tubes connected thereto, which are filled with sensitive liquid be raised to a level higher than that of the indicating tubes of the thermometer.

In order that the invention may be the better understood drawings are appended in which:—

Figure 1 is a front elevation of a form of thermometer according to this invention.

Fig. 2 is a section on line AA Fig. 1.

Referring to the accompanying drawings, 1 indicates a suitable base provided with side plates 2 and which plates 2 are provided with inner guide plates 2ª the lower edges of which form projections 3 forming with the base 1 opposing guiding grooves in which there is arranged to slide a plate 4 provided upon its outer surface with a suitable scale for the tube 7 which contains a suitable liquid. A knob or handle 6 is provided for the manipulation of plate 4. The two glass tubes 5, 7, containing the sensitive liquid, a suitable hydrocarbon for example, are secured in any convenient manner to the base 1, the plate 4 being cut away at the point 9 which is the zero line of the scale as shown in Fig. 1 and connected respectively to 5 and 7 are small tubes 11, 10 secured thereto by means of the plate 12 which is secured by screws to the base 1. The tubes 10 and 11 are contained in a flexible outer tube 13 connected to the lower end of the bulb 14 by means of a union 15 shown disconnected in Fig. 1. The tube 10 is connected to the glass tube 7 and to the bulb 14 while the second tube 11 is connected to the glass tube 5 and stops short at a point outside the bulb 14 as shown in Fig. 1. Each of the tubes 5 and 7 is provided at its upper end with a bulbous enlargement shown by the dotted lines 5ª, 7ª in Fig. 1 closed to the atmosphere but in communication with the respective tubes 5 and 7 of which they form part. Each of the enlargements is filled as also the space above the sensitive fluid with a gas or gaseous mixture which is under sufficient pressure to counterbalance any pressure of the sensitive liquid due to the distance bulb being at a higher level than the indicating tubes 5 and 7. 16 indicates a case or cover for the lower end of the glass tubes, a similar case or cover 17 being provided for the upper end of said glass tubes.

In use the scale plate 4 is adjusted with its edge 9 level with the top of the liquid in tube 5, connected to which is the compensating tube 11, when the temperature may be read from the scale beneath tube 7.

Claims:

1. In a distance thermometer, a base having upstanding side walls formed with opposing guiding grooves, a scale plate slidable in the grooves across the base, a main indicating tube and a second indicating tube having gas-containing bulbous upper ends, distance tubes connected to their lower ends, a cover inclosing the lower ends of said indicating tubes and spaced from one side wall of the base, said scale plate having a downward extension to one side between the cover and the spaced side wall of the base, and scale plate shifting means connected with the downward extension and disposed between the cover and said spaced side wall.

2. In a distance thermometer, a base having upstanding side walls formed with opposing guiding grooves, a scale plate, provided with a scale and slidable in the grooves across the base, a main indicating tube and a second indicating tube having gas-containing bulbous upper ends, distance tubes connected to their lower ends, a cover inclosing the lower ends of said indicating tubes and spaced from one side wall of the base, said scale plate having a downward extension to one side between the cover and the spaced side wall of the base, and scale plate shifting means connected with the downward extension and disposed between the cover and said spaced side wall, the lower edge of said scale plate forming the zero line of said scale.

In testimony whereof I affix my signature in the presence of two witnesses.

JOHN FOX JENNENS MALONE.

Witnesses:
 PERCY CORDER,
 H. NIXON.

Copies of this patent may be obtained for five cents each, by addressing the "Commissioner of Patents, Washington, D. C."